(12) United States Patent
Bacile et al.

(10) Patent No.: US 6,717,299 B2
(45) Date of Patent: Apr. 6, 2004

(54) ISOLATION SYSTEM FOR A MOTOR

(75) Inventors: Adam C. Bacile, Livonia, MI (US); Peter Kusserow, Commerce, MI (US); Abdul-Hafiz Afaneh, Farmington Hills, MI (US); Irfan Bhatti, Farmington, MI (US); Brian Parker, Troy, MI (US)

(73) Assignee: Robert Bosch Corporation, Broadview, IL (US)

( * ) Notice: Subject to any disclaimer, the term of this patent is extended or adjusted under 35 U.S.C. 154(b) by 1 day.

(21) Appl. No.: 10/016,206

(22) Filed: Oct. 30, 2001

(65) Prior Publication Data

US 2003/0080635 A1 May 1, 2003

(51) Int. Cl.⁷ ............................. H02K 5/24; H02K 5/00
(52) U.S. Cl. ........................................ 310/51; 310/89
(58) Field of Search ............................ 310/51, 91, 89, 310/71, 59, 58, 52

(56) References Cited

U.S. PATENT DOCUMENTS

| | | | | |
|---|---|---|---|---|
| 2,093,471 A | * | 9/1937 | Newill .......................... 310/91 |
| 4,071,794 A | * | 1/1978 | Schoen ......................... 310/42 |
| 4,128,935 A | * | 12/1978 | Czech et al. .................. 310/42 |
| 4,185,214 A | | 1/1980 | Gerber et al. ................. 310/51 |
| 4,363,984 A | | 12/1982 | Torii et al. .............. 310/156.12 |
| 4,425,813 A | | 1/1984 | Wadensten ..................... 74/87 |
| 4,597,300 A | | 7/1986 | Beardmore et al. ........... 74/5 R |
| 4,726,112 A | * | 2/1988 | King et al. .................... 29/596 |
| 4,742,256 A | | 5/1988 | Tanaka et al. ................. 310/51 |
| 4,891,540 A | * | 1/1990 | Cooper et al. ................. 310/51 |
| 4,908,538 A | * | 3/1990 | Geberth, Jr. .................. 310/89 |
| 4,963,076 A | | 10/1990 | Fleischmann et al. ... 417/423.7 |
| 5,049,770 A | * | 9/1991 | Gaeth et al. ................... 310/89 |
| 5,113,104 A | | 5/1992 | Blaettner et al. .............. 310/90 |
| 5,194,769 A | | 3/1993 | Ade et al. ..................... 300/51 |
| 5,440,186 A | * | 8/1995 | Forsell et al. ................. 310/89 |
| 5,497,039 A | * | 3/1996 | Blaettner et al. .............. 310/51 |
| 5,786,647 A | | 7/1998 | Vollmer et al. ................ 310/89 |
| 5,905,320 A | | 5/1999 | Periyathamby et al. ....... 310/89 |
| 5,945,756 A | * | 8/1999 | Periyathamby et al. ....... 310/89 |
| 5,959,379 A | | 9/1999 | Hu et al. ....................... 310/51 |
| 5,969,447 A | | 10/1999 | Periyathamby et al. ....... 310/89 |
| 6,021,993 A | * | 2/2000 | Kirkwood ..................... 310/51 |
| 6,028,379 A | | 2/2000 | Bertolini et al. .............. 310/51 |
| 6,045,112 A | | 4/2000 | Kirkwood ................... 248/634 |
| 6,076,795 A | | 6/2000 | Scheidel et al. ............ 248/608 |
| 6,107,706 A | | 8/2000 | Neckermann et al. ........ 310/51 |
| 6,163,093 A | | 12/2000 | Shimizu et al. ............... 310/42 |
| 6,262,504 B1 | * | 7/2001 | Bartlett ......................... 310/89 |
| 6,538,350 B2 | * | 3/2003 | Martin ........................... 310/89 |

FOREIGN PATENT DOCUMENTS

JP  02-075799  3/1990
JP  09-105397  4/1997

* cited by examiner

Primary Examiner—Nicholas Ponomarenko
Assistant Examiner—J. Aguirrechea
(74) Attorney, Agent, or Firm—Michael Best & Friedrich LLP

(57) ABSTRACT

A motor housing assembly houses a motor having a casing defining an axial length and an output shaft extending from the casing. The assembly includes a housing defining a cavity with an open end for receiving the motor and a partially closed end opposite the open end. The housing has a length larger than the axial length of the casing such that the entire casing of the motor can be received within the cavity. The assembly further includes an end cap configured to substantially close the open end of the housing and retain the motor in the housing, a first isolator member configured to be sandwiched between the casing and the end cap to substantially isolate the motor from both the housing and the end cap, and a second isolator member configured to be sandwiched between the casing and the housing to substantially isolate the motor from the housing.

22 Claims, 3 Drawing Sheets

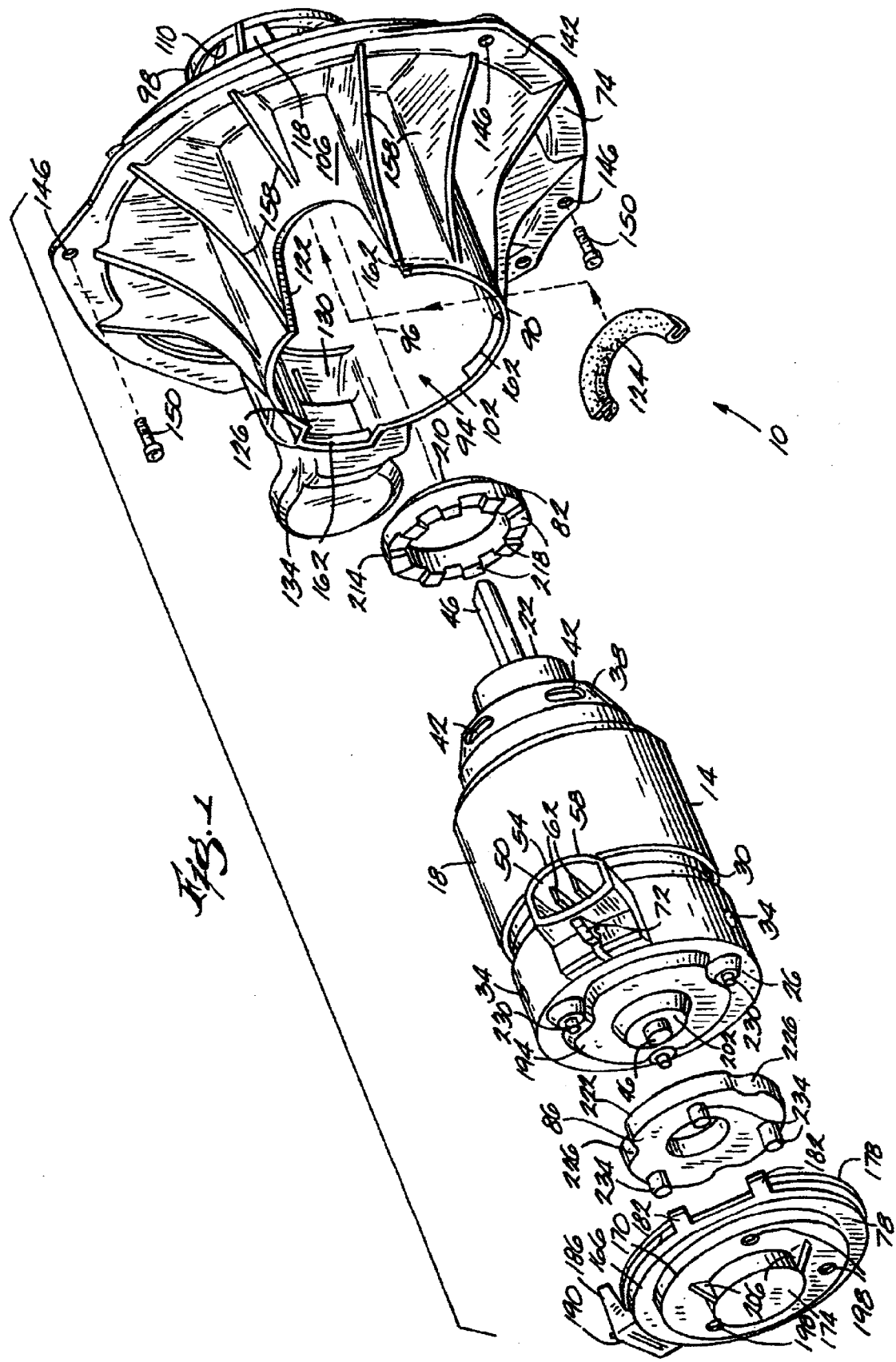

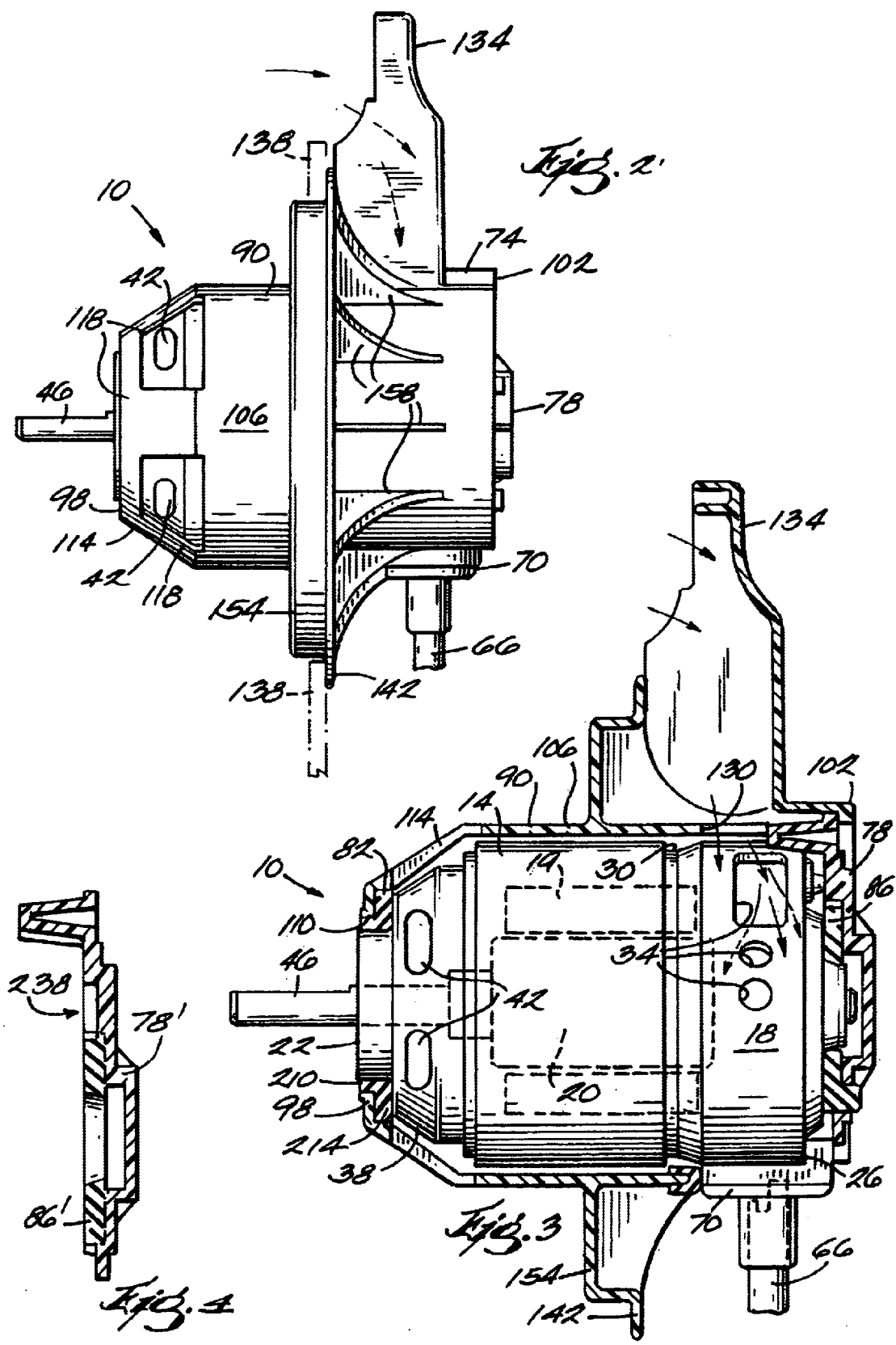

ISOLATION SYSTEM FOR A MOTOR

FIELD OF THE INVENTION

The invention relates generally to vibration isolation, and more particularly to a device for coupling an electric motor to a support structure and isolating the vibration of the electric motor from the support structure.

BACKGROUND OF THE INVENTION

An electric motor is commonly used to power the fan in the heating, ventilation, and air-conditioning (HVAC) system of an automobile. The motor is typically retained in a motor housing assembly that is mounted to an air case. Various techniques have been employed to isolate the vibrations generated by the motor from the air case and the adjoining structure. For example, it has been known to use elastomeric grommets that surround the fasteners used to secure the motor housing assembly to the air case. It has also been known to make the motor housing assembly from a resilient, vibration-damping material.

When the motor housing assembly is made from more rigid materials, such as plastics, it has also been known to wrap or otherwise surround the circumference of the motor with a resilient band or shroud intended to isolate the motor from the motor housing assembly. When the motor is received in the motor housing assembly, the vibrations generated by the motor are dampened by the band or shroud and are not transmitted radially outwardly to the motor housing assembly. Other motor housing assemblies incorporate one or more damping pads located between an end of the motor and the motor housing.

SUMMARY OF THE INVENTION

Prior art motor housing assemblies are relatively expensive and have proven to be difficult to assemble and mount on the air case. For example, with some prior art designs, mounting holes in the motor must be painstakingly aligned with holes in the motor housing assembly and also with holes in one or more damping pads in order to secure the motor and damping pads in the motor housing assembly. Adhesives are typically required to secure the damping bands or shrouds to one or both of the motor or the motor housing. Additionally, the motor housing assembly typically includes two housing halves that must be carefully aligned with one another, brought together around the motor, and secured together at multiple locations to encase the motor. The housing halves often inhibit the proper cooling of the electric motor, which ultimately reduces the motor's efficiency.

The present invention provides an improved vibration and noise isolation system for a motor. The motor housing assembly of the present invention is easy to assemble and is less expensive than prior art devices. Improved motor cooling is achieved without sacrificing the structural stability of the housing assembly.

Other features and advantages of the invention will become apparent to those skilled in the art upon review of the following detailed description, claims, and drawings.

BRIEF DESCRIPTION OF THE DRAWINGS

FIG. 1 is an exploded perspective view of a motor and a motor housing assembly embodying the invention.

FIG. 2 is a side view showing the motor assembled in the motor housing assembly of FIG. 1.

FIG. 3 is an enlarged side view, partially in section, of the assembled motor housing assembly of FIG. 1.

FIG. 4 is a section view showing an alternative end cap having an integral isolator member.

Figure 5:
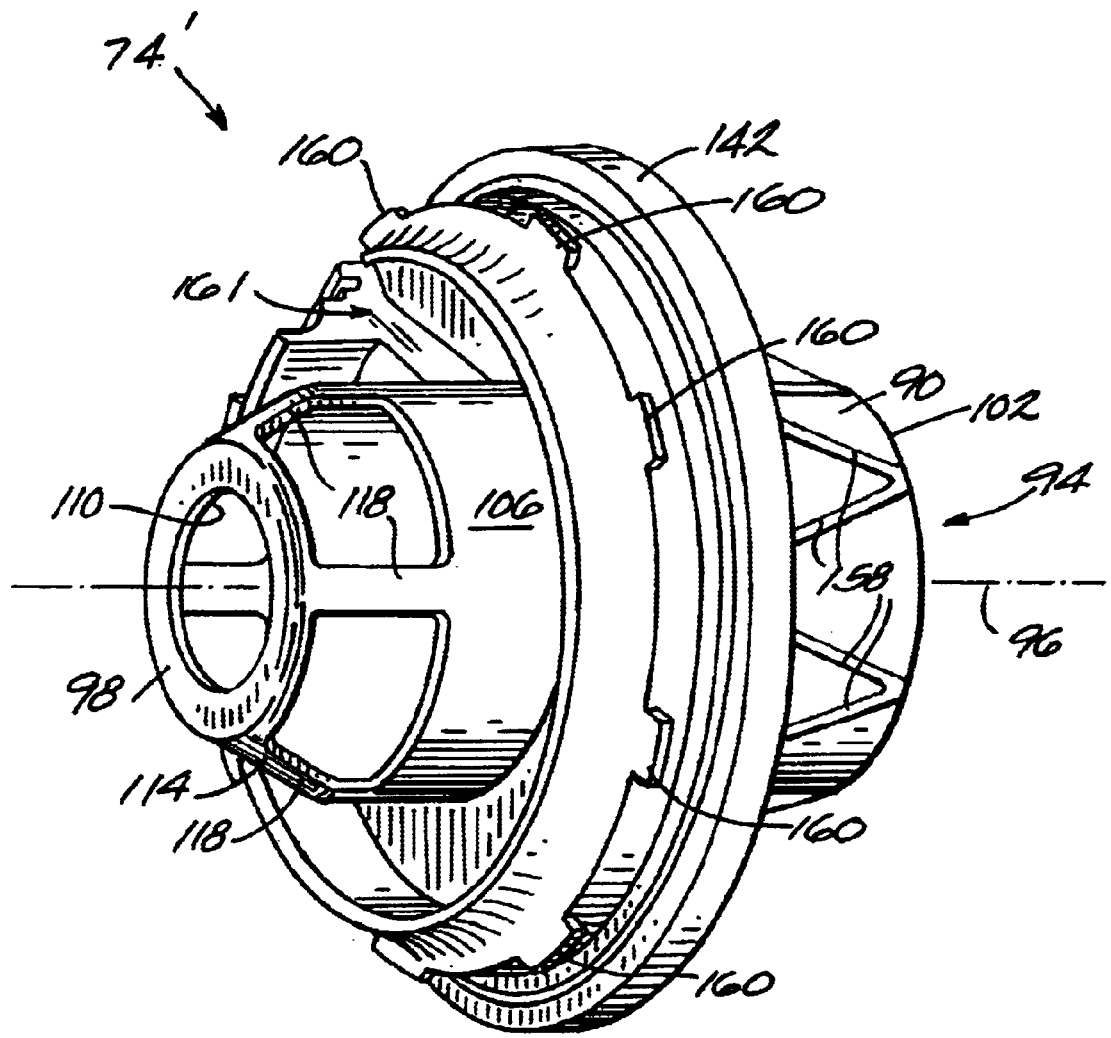
FIG. 5 shows an alternative housing arrangement.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIGS. 1–3 illustrate a motor housing assembly 10 embodying the invention. The illustrated motor housing assembly 10 is designed to house an electric motor 14 used to power a fan or blower in the HVAC system of an automobile (not shown). Of course, the motor housing assembly 10 and motor 14 could also be used in other applications utilizing an electric motor.

The illustrated electric motor 14 includes a substantially tubular casing 18 that contains the stator 19, the rotor 20, and the other components (not shown) of the motor 14. The casing 18 includes a front end 22 and a rear end 26. The terms "front" and "rear" are used for purposes of description only, and are not intended to imply any particular orientation of the motor 14 or the motor housing assembly 10. In the illustrated embodiment, the casing 18 includes a circumferential groove 30 between the front and rear ends 22 and 26. Apertures 34 are formed in the casing 18 between the groove 30 and the rear end 26, and provide a communication pathway for ambient air to enter the casing 18 and cool the motor 14. The casing 18 also includes a transition or nose portion 38 adjacent the front end 22. The nose portion 38 also includes a plurality of cooling apertures 42.

A drive shaft or output shaft 46 is rotatably supported in spaced-apart bearings (not shown) housed within the casing 18 at the front and rear ends 22 and 26. One end of the drive shaft 46 extends from the front end 22 to be drivingly coupled to the fan or blower device, as is understood by those skilled in the art. In the illustrated embodiment, the opposite end of the drive shaft 46 extends slightly from the rear end 26.

An electrical connector 50 (see FIG. 1) is provided for connection to an electrical power supply (not shown). The connector 50 extends radially outwardly from the casing 18 near the rear end 26 and is defined by a wall 54 having an outer surface 58. Electrical conductors or contacts 62 extend radially outwardly from the casing 18 within the connector 50. A power cord 66 (see FIGS. 2 and 3) includes a plug 70 adapted to be received in the connector 50 to provide electrical power to the contacts 62. In the illustrated embodiment, the connector 50 also includes a locking feature 72 that removably secures the plug 70 to the connector 50. It should be noted that other suitable electric motors could be substituted for the illustrated motor 14 without deviating from the invention. Of course, modifications to the motor housing assembly 10 might be needed to accommodate different motors. For example, if the axial length of the motor 14 is changed, the axial length of some or all of the motor housing assembly components would also be changed.

The motor housing assembly 10 includes a housing 74, an end cap 78, a front isolator member 82, and a rear isolator member 86. The housing 74 includes a central portion 90 defining a substantially tubular cavity 94 for receiving the motor 14. The central portion 90 has a longitudinal axis 96 and includes a front end 98 for receiving the front end 22 of the motor, a rear end 102 for receiving the rear end 26 of the motor 14, and a body portion 106 extending between the front and rear ends 98 and 102. The rear end 102 is open to provide access to the cavity 94. The front end 98 includes a central axial aperture 110 through which the drive shaft 46 extends. The body portion 106 includes a transition or nose portion 114 that substantially corresponds to the nose portion 38 of the motor 14. The nose portion 114 is partially closed to substantially retain the motor 14 in the housing 74, while allowing the drive shaft 46 to extend through the central axial aperture 110.

In the illustrated embodiment, the nose portion 114 is defined by a plurality of spaced-apart ribs 118 that extend between the body portion 106 and the front end 98. The nose portion 114 is substantially open to ambient airflow between the ribs 118, and as seen in FIG. 2, the motor 14 is positioned in the central portion 90 such that the cooling apertures 42 are located adjacent the open areas between the ribs 118. The configuration of the nose portion 114 facilitates cooling of the motor 14 without sacrificing the structural stability of the housing 74.

As best seen in FIG. 1, the central portion 90 also includes a notch 122 extending from the rear end 102 and into the body portion 106. The notch 122 is configured to receive the electrical connector 50, and thereby properly align and orient the motor 14 in the central portion 90. The notch 122 is sized to be larger than the connector 50 so that the outer surface 58 of the connector wall 54 does not directly contact the central portion 90 when the motor 14 is installed. A piece of sealing and vibration isolating material 124 (see FIG. 1), such as open-celled foam or other suitable material, is placed in the clearance opening between the connector 50 and the notch 122 to substantially seal the central portion 90 and isolate the motor 14 from the housing 74. Of course, the particular contour of the connector outer wall 58 and the notch 122 can vary.

Still referring to FIG. 1, the central portion 90 further includes a cooling duct 126 extending from the rear end 102 and into the body portion 106. The cooling duct 126 includes an inlet aperture 130 that provides for airflow into the cavity 94. As illustrated by the arrows in FIG. 3, air entering the cavity 94 via the inlet aperture 130 circulates through and around the casing 18 to cool the motor 14. The circulation of cooling airflow is facilitated by the circumferential groove 30 and the cooling apertures 34 in the casing 18. A baffle 134 extends radially from the central portion 90 adjacent the inlet aperture 130 and directs airflow into the inlet aperture 130, as illustrated by the arrows in FIGS. 2 and 3.

The housing 74 is mounted to an automobile air case 138 (shown in phantom in FIG. 2) via a mounting flange 142. In the illustrated embodiment, the mounting flange 142 includes a plurality of mounting holes 146 for receiving fasteners 150 that secure the housing 74 to the air case 138. The mounting flange 142 also includes a sealing portion 154 configured to fit into and substantially seal an opening defined by the air case 138, thereby substantially preventing air leakage through the air case 138. In the illustrated embodiment, the mounting flange 142 is supported by a plurality of ribs 158 that extend radially from the central portion 90 of the housing 74.

The housing 74 is preferably a molded plastic part that can be varied to suit the spatial constraints and design parameters of any particular automobile. For example, the mounting flange 142 need not be fastened to the air case 138 via the fasteners 150. Rather, the mounting flange 142 could be fastened in other manners, such as by a twist-lock type engagement. In this case, the mounting holes 146 and fasteners 150 would be replaced by locking tabs or other suitable structure on or adjacent the mounting flange 142 and/or the air case 138. Additionally, the mounting flange 142 need not include the illustrated sealing portion 154, but rather could include a sealing portion having a different configuration designed to fit in the particular air case opening. Alternatively, the sealing portion 154 could be eliminated altogether. Furthermore, the configuration of the baffle 134 could be varied, including making the baffle 134 integral with the mounting flange 142. Alternatively, the baffle 134 could be eliminated altogether. If the baffle 134 is eliminated, additional inlet apertures could be formed along the axial length of the body portion 106 to increase the flow of air into the housing 74.

FIG. 5 illustrates an alternative housing 74' that includes many of the alterations discussed above, including the presence of locking tabs 160 to provide a twist-lock mounting engagement, the absence of the sealing portion 154, and the absence of the baffle 134. An air inlet 161 is formed directly in the body 106 and the flange 142 to introduce cooling air into the housing 74'. Like parts have been given like reference numerals.

The motor 14 is retained in the housing 74 by the end cap 78. In the illustrated embodiment, the end cap 78 is inserted into the rear end 102 of the central portion 90 and is retained therein by a plurality resilient locking tabs 162 spaced around the interior wall of the central portion 90, as will be described below. Of course, other suitable fastening techniques can also be employed to secure the end cap 78 to the housing 74.

The end cap 78 is preferably plastic and includes (see FIG. 1) a substantially circular large-diameter portion 166, a substantially circular intermediate-diameter portion 170 offset axially from the large-diameter portion 166, and a substantially circular small-diameter portion 174 offset axially from the intermediate-diameter portion 170. A substantially circular flange 178 extends radially from the large-diameter portion 166 and terminates at spaced-apart locating tabs 182. The locating tabs 182 are positioned in the notch 122 when assembled. A resilient tab portion 186 extends radially outwardly from the large-diameter portion 166 and is configured to fit into and engage the cooling duct 126. The tab portion 186 includes a rear surface 190 that lies substantially in the same plane as the flange 178. When the end cap 78 is inserted into the cavity 94, the locking tabs 162 deflect radially outwardly, allowing the flange 178 and the rear surface 190 of the tab portion 186 to enter the cavity 94 until the locking tabs 162 snap into place over the flange 178 and the rear surface 190.

The intermediate-diameter portion 170 accommodates a first raised portion 194 on the rear end 26 of the motor 14 and includes a plurality of aligning apertures 198, the purpose of which will be described in detail below. The small-diameter portion 174 accommodates a second raised portion 202 on the rear end 26 of the motor as well as the end of the drive shaft 46 projecting therefrom. In the illustrated embodiment, support ribs 206 extend between the rear surface of the small-diameter portion 174 and the rear surface of the intermediate-diameter portion 170.

The motor 14 is isolated from the housing 74 and the end cap 78 by the front isolator member 82, the rear isolator member 86, and the piece of sealing and isolating material 124. As best seen in FIGS. 1 and 3, the front isolator member 82 is substantially ring-shaped and includes a nose-portion 210 having an inner diameter sized to slideably receive the front end 22 of the motor 14 and an outer diameter sized to be received in the axial aperture 110 of the housing 74, thereby positioning the motor 14 radially within the housing 74 and isolating the motor 14 from the housing 74.

The front isolator member 82 further includes a flange portion 214 that engages the housing 74 on one side and engages the nose portion 38 of the motor 14 on the other side to position the motor 14 axially within the housing 74 and to isolate the motor 14 from the housing 74. In the illustrated embodiment, the flange portion 214 includes a plurality of ribs 218 on the side engaging the nose portion 38 of the motor 14. The ribs 218 improve the isolating characteristics of the front isolator member 82. Of course, the specific number and configuration of the ribs 218 can be altered as desired. Furthermore, the ribs 218 could be eliminated altogether.

The rear isolator member 86 is also substantially ring-shaped and includes a base 222 that engages the rear end 26 of the motor 14 on one side and engages the end cap 78 on the other side to position the motor 14 both axially and radially within the housing 74 and to isolate the motor 14 from the end cap 78 and the housing 74. The base 222 has an inner diameter sized to slideably receive the second raised portion 202 on the rear end 26 of the motor 14, thereby positioning the rear isolator member 86 radially with respect to the motor 14.

In the illustrated embodiment, the outer diameter of the base 222 includes three notches 226 which provide clearance between the base 222 and the three brush card isolators 230 extending through the rear end 26 of the motor 14. The base 222 also includes three projections 234 configured to be received in the aligning apertures 198 of the end cap 78. The projections 234 function to prevent relative movement of the rear isolator member 86 with respect to the motor 14 and the end cap 78. Of course, the specific number and configuration of the projections 234 and the corresponding aligning apertures 198 can be altered as desired. Furthermore, other suitable methods for anti-rotating the rear isolator member 86 with respect to the end cap 78 and the motor 14 can also be used.

The front and rear isolator members 82 and 86 are preferably made from a resilient material, such as a thermoplastic elastomer or another suitable material. While the isolator members 82 and 86 are shown in FIGS. 1 and 3 to be separate components of the motor housing assembly 10, the front isolator member 82 could be integrally formed with the housing 74 and the rear isolator member 86 could be integrally formed with the end cap 78. Insert molding techniques would provide one method for integrating the resilient isolator members 82 and 86 with the more rigid housing 74 and end cap 78. Alternatively, adhesives could be used to secure the isolator members 82 and 86 to the housing 74 and the end cap 78.

FIG. 4 illustrates an example of a combined end cap and rear isolator member 238 having an end cap portion 78' and an isolator portion 86'. With the isolator portion 86' secured to the end cap portion 78', the projections 234 and the aligning apertures 98 can be eliminated.

Assembly and mounting of the motor housing assembly 10 will now be described. First, the front isolator member 82 is positioned either in the axial aperture 110 of the housing 74 or on the front end 22 of the motor 14 as described above. Next, the piece of sealing and isolating material 124 is positioned either in the notch 122 or around the connector 50. The motor 14 is then coaxially aligned with the central portion 90 by aligning the connector 50 with the notch 122. Once aligned, the motor 14 can be inserted into the cavity 94 until the front end 22 of the motor 14 is supported in the front end 98 of the housing 74 via the front isolator member 82. When the motor 14 is fully inserted into the cavity 94, substantially all of the casing 18 is within the central portion 90. In other words, the axial length of the central portion 90 is as long or longer than the axial length of the motor casing 18 so that the entire length of the casing 18 can be retained within the single housing 74.

Next, the rear isolator member 86 is placed on the rear end 26 of the motor as described above, so that the protrusions 234 are in alignment with the aligning apertures 198 in the end cap 78. Alternatively, the rear isolator member 86 could be positioned against the end cap 78 first. The end cap 78 is then aligned with and inserted into the cavity 94. Force is applied to the end cap 78 to compress the isolator members 82 and 86, thereby causing the flange 178 and the rear surface 190 to deflect the respective locking tabs 162 and move forwardly into the cavity 94 until the locking tabs 162 snap into place. The compressed isolators 82 and 86 exert an opposing force on the end cap 78. The opposing force keeps the flange 178 and the rear surface 190 securely engaged against the locked locking tabs 162.

The range of compression for the isolators 82 and 86 is preferably between zero and twenty percent, and more preferably between five and fifteen percent. The specific compression range can be varied as desired by varying the tolerance and design sensitivity of the components of the motor housing assembly 10.

Once the end cap 78 is locked into place (see FIG. 3), the motor 14 is isolated from both the housing 74 and the end cap 78 by the isolator members 82 and 86 and by the piece of sealing and isolating material 124. In other words, no portion of the motor 14 is in direct contact with the housing 74 or the end cap 78. Once assembled, the motor housing assembly 10 and the motor 14 can be transported as a modular unit, with the motor 14 being securely retained within the motor housing assembly 10. The assembled motor housing assembly 10 and motor 14 is mounted to the air case 138 via the mounting flange 142 using the fasteners 150, the twist-lock tabs 160 (as shown in FIG. 5), or any other suitable securing mechanisms. Once the motor 14 and assembly 10 are mounted to the air case 138, the drive shaft 46 is coupled to the fan or blower, and the plug 70 is connected to the connector 50. The motor 14 and motor housing assembly 10 can be removed from the air case 138 and disassembled in the opposite manner.

The motor housing assembly 10 of the present invention is easy to assemble. No tools or fasteners are required and no difficult alignment steps are needed. If necessary, the end cap 78 can be removed from the housing 74 using a pliers or other commonly available tools. When assembled, the motor housing assembly 10 is self-contained and can be easily mounted to the air case 138. The isolator members 82 and 86 and the piece of isolating material 124 isolate the motor 14 from the housing 74 and the end cap 78 to substantially eliminate any vibration transmission pathways between the motor 14 and the air case 138. Various features of the invention are set forth in the following claims.

What is claimed is:

1. A motor housing assembly for housing a motor, the motor having a casing defining an axial length and an output shaft extending from the casing, the motor housing assembly comprising:

a housing defining a cavity with an open end for receiving the motor and a partially closed end opposite the open end such that the output shaft can extend from the partially closed end but the motor cannot be removed from the housing through the partially closed end, the housing having a length larger than the axial length of the casing such that the entire casing of the motor can be received within the cavity;

an end cap configured to substantially close the open end of the housing and retain the motor in the housing;

a first isolator member configured to be sandwiched between the casing and the end cap to substantially isolate the motor from both the housing and the end cap; and a second isolator member configured to be sandwiched between the casing and the housing to substantially isolate the motor from the housing.

2. The motor housing assembly of claim 1, wherein the housing includes a notch configured to receive an electrical connector of the motor, and wherein the motor housing assembly further includes a piece of sealing and vibration isolating material coupled to the housing adjacent the notch.

3. The motor housing assembly of claim 1, wherein the housing includes a mounting flange extending radially from the housing between the open end and the partially closed end for mounting the housing to a vehicle.

4. The motor housing assembly of claim 3, wherein the mounting flange includes a plurality of mounting holes for receiving fasteners.

5. The motor housing assembly of claim 3, wherein the housing includes a plurality of locking tabs adjacent the mounting flange.

6. The motor housing assembly of claim 1, wherein the partially closed end is defined by a plurality of ribs.

7. The motor housing assembly of claim 1, wherein the housing includes a plurality of resilient locking tabs adjacent the open end and configured to engage the end cap such that the end cap can be coupled to the open end without the use of tools or fasteners.

8. The motor housing assembly of claim 1, wherein the housing includes an air inlet aperture communicating with the cavity, and a baffle portion adjacent the air inlet aperture to provide cooling air flow into the cavity.

9. The motor housing assembly of claim 1, wherein the first isolator member includes a plurality of projections configured to be received in a corresponding plurality of apertures in the end cap to substantially prevent relative movement between the first isolator member and the end cap.

10. The motor housing assembly of claim 1, wherein the first isolator member is integrally formed with the end cap.

11. The motor housing assembly of claim 1, wherein the second isolator member is sandwiched between the casing and the partially closed end of the housing.

12. A self-contained HVAC drive unit for mounting to a vehicle, the unit comprising:

a motor having a rotor, a stator, a casing surrounding the rotor and the stator and defining an axial length, and an output shaft extending from the casing;

a housing defining a cavity with an open end for receiving the motor and a partially closed end opposite the open end such that the output shaft can extend from the partially closed end but the motor cannot be removed from the housing through the partially closed end, the housing having a length larger than the axial length of the casing such that the entire casing of the motor is received within the cavity;

an end cap coupled to the open end of the housing to substantially close the open end of the housing and retain the motor in the housing;

a first isolator member sandwiched between the casing and the end cap to substantially isolate the motor from both the housing and the end cap; and a second isolator member sandwiched between the casing and the housing to substantially isolate the motor from the housing.

13. The self-contained HVAC drive unit of claim 12, wherein the motor includes an electrical connector, wherein the housing includes a notch configured to receive the electrical connector, and wherein the drive unit further includes a piece of sealing and vibration isolating material sandwiched between the electrical connector and the notch.

14. The self-contained HVAC drive unit of claim 12, wherein the housing includes a mounting flange extending radially from the housing between the open end and the partially closed end for mounting the housing to the vehicle.

15. The self-contained HVAC drive unit of claim 14, wherein the mounting flange includes a plurality of mounting holes for receiving fasteners.

16. The self-contained HVAC drive unit of claim 14, wherein the housing includes a plurality of locking tabs adjacent the mounting flange.

17. The self-contained HVAC drive unit of claim 12, wherein the partially closed end is defined by a plurality of ribs.

18. The self-contained HVAC drive unit of claim 12, wherein the housing includes a plurality of resilient locking tabs adjacent the open end and configured to engage the end cap such that the end cap can be coupled to the open end without the use of tools or fasteners.

19. The self-contained HVAC drive unit of claim 12, wherein the housing includes an air inlet aperture communicating with the cavity, and a baffle portion adjacent the air inlet aperture to provide cooling air flow into the cavity.

20. The self-contained HVAC drive unit of claim 12, wherein the first isolator member includes a plurality of projections configured to be received in a corresponding plurality of apertures in the end cap to substantially prevent relative movement between the first isolator member and the end cap.

21. The self-contained HVAC drive unit of claim 12, wherein the first isolator member is integrally formed with the end cap.

22. The self-contained HVAC drive unit of claim 12, wherein the second isolator member is sandwiched between the casing and the partially closed end of the housing.

* * * * *